(12) United States Patent
Yoshitake et al.

(10) Patent No.: US 10,377,421 B2
(45) Date of Patent: Aug. 13, 2019

(54) UPPER VEHICLE-BODY STRUCTURE OF VEHICLE

(71) Applicant: MAZDA MOTOR CORPORATION, Hiroshima (JP)

(72) Inventors: Koji Yoshitake, Hiroshima (JP); Toshiyuki Koga, Hiroshima (JP); Tomohiro Kadohata, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/876,230

(22) Filed: Jan. 22, 2018

(65) Prior Publication Data

US 2018/0237074 A1 Aug. 23, 2018

(30) Foreign Application Priority Data

Feb. 21, 2017 (JP) .................................. 2017-030277

(51) Int. Cl.
| | | |
|---|---|---|
| *B62D 21/15* | (2006.01) | |
| *B62D 27/02* | (2006.01) | |
| *B62D 25/02* | (2006.01) | |
| *B62D 25/04* | (2006.01) | |
| *B62D 25/06* | (2006.01) | |

(52) U.S. Cl.
CPC .......... *B62D 21/157* (2013.01); *B62D 25/02* (2013.01); *B62D 25/04* (2013.01); *B62D 25/06* (2013.01); *B62D 27/023* (2013.01)

(58) Field of Classification Search
CPC ........ B62D 25/02; B62D 25/04; B62D 25/06; B62D 27/04; B62D 21/157

USPC .... 296/203.01, 203.03, 210, 187.12, 193.06; 188/371–377

See application file for complete search history.

(56) References Cited

U.S. PATENT DOCUMENTS

| | | | | |
|---|---|---|---|---|
| 3,457,688 | A * | 7/1969 | Znamirowski | .......... E04B 9/068 403/219 |
| 8,944,494 | B2 * | 2/2015 | Nakamura | ............. B62D 25/06 296/187.12 |
| 8,960,779 | B2 * | 2/2015 | Nishimura | ............. B62D 25/06 296/203.03 |
| 9,185,991 | B2 * | 11/2015 | Owens | .................... A47C 23/02 |
| 2014/0028057 | A1 * | 1/2014 | Nishimura | ............. B62D 25/04 296/193.06 |
| 2016/0107698 | A1 * | 4/2016 | Oshima | ................ B62D 21/157 296/187.12 |

(Continued)

FOREIGN PATENT DOCUMENTS

| | | |
|---|---|---|
| JP | 2006-192998 A | 7/2006 |
| JP | 2013-028216 A | 2/2013 |
| JP | 2014-024505 A | 2/2014 |

*Primary Examiner* — Dennis H Pedder

(74) *Attorney, Agent, or Firm* — Studebaker & Brackett PC

(57) ABSTRACT

In a vehicle-body structure in which a roof side rail portion of a side face portion of a vehicle body and a roof reinforcement are connected via a gusset so as to suppress that a center pillar portion comes into a cabin side when a large load is inputted from a vehicle side, a notch portion is provided at the gusset. Thereby, it is suppressed that, when the large load is inputted to the center pillar portion from the vehicle side, the gusset is so bending-deformed by a rotation of the roof side rail portion that a rotational moment caused by the rotation of the roof side rail portion acts on the roof reinforcement, suppressing that the center pillar portion comes into the cabin side.

2 Claims, 9 Drawing Sheets

(56) References Cited

U.S. PATENT DOCUMENTS

2016/0129944 A1 5/2016 Nishimura et al.
2016/0214649 A1* 7/2016 Emura .................. B62D 25/04

* cited by examiner

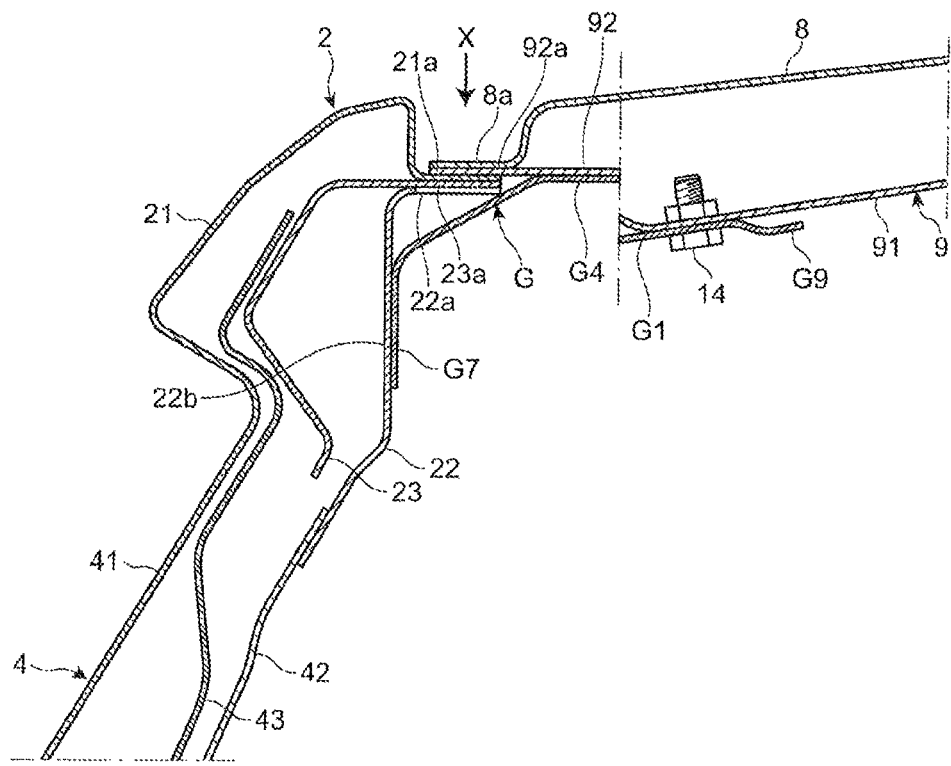
FIG. 4
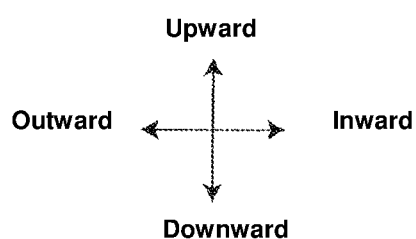

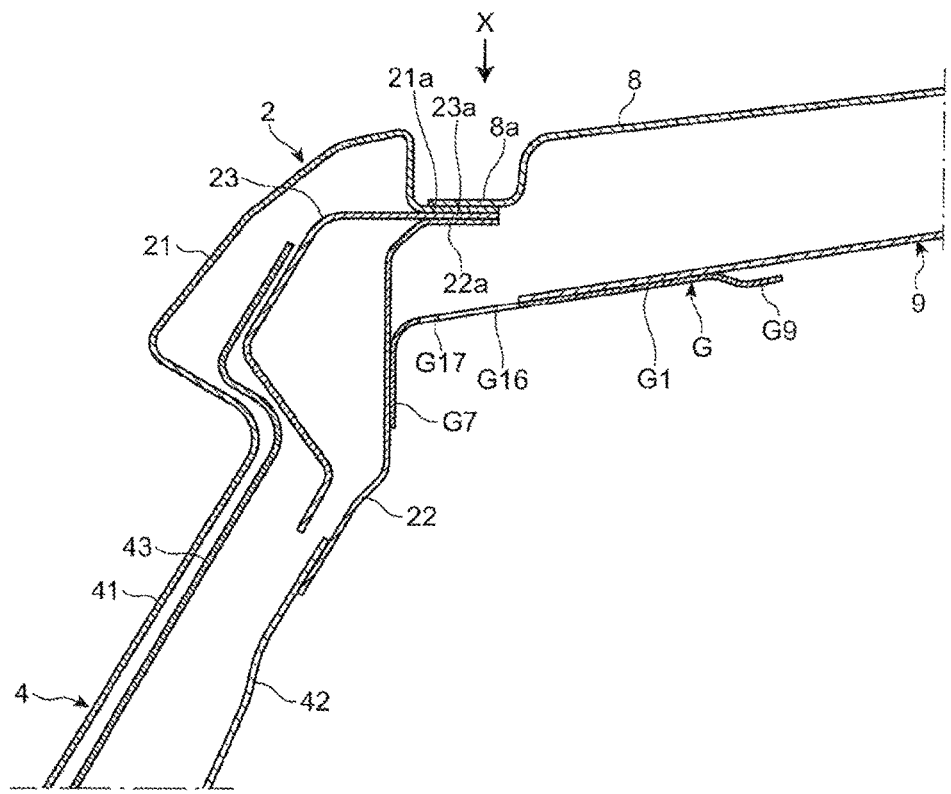
FIG. 7
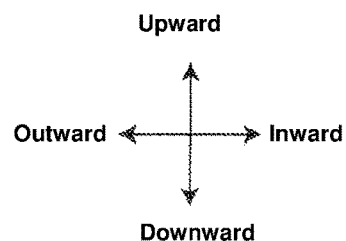

UPPER VEHICLE-BODY STRUCTURE OF VEHICLE

BACKGROUND OF THE INVENTION

The present invention relates to an upper vehicle-body structure of a vehicle which considers an input of a large load from a vehicle side.

US Patent Application Publication No. 2016/0129944 discloses, as the above-described upper vehicle-body structure of the vehicle, a vehicle-body structure which comprises right-and-left center pillars provided at both-side portions of the vehicle, right-and-left roof side rails extending in a longitudinal direction of the vehicle above the right-and-left center pillars, and a roof reinforcement provided at the same positions, in a vehicle-body longitudinal direction, as the center pillars and interconnecting the right-and-left roof side rails in a vehicle width direction.

In the above-described vehicle body, a gusset is attached over the roof reinforcement and the roof side rail so that a load inputted to the center pillar from the vehicle side is transmitted to the roof reinforcement by way of this gusset. Thereby, this load is effectively dispersed to the roof reinforcement, so that it is suppressed that the center pillar comes into a cabin side.

However, according to the vehicle-body structure disclosed in the above-described patent document, even though the center pillar is prevented from coming into the cabin side greatly when a large load (i.e., a load having a specified magnitude or greater), such as an impact load which occurs in a vehicle side collision, is inputted from the vehicle side, the roof side rail may be rotated such that its lower portion is turned toward the vehicle inside in accordance with vehicle-inward deformation of an upper portion of the center pillar, a bending moment to cause a joint portion of the gusset to the roof reinforcement to move upward may occur because of the above-described rotation of the roof side rail, and the amount of load-transmission to the roof side rail and the center pillar, which are positioned on the side where the above-described load is not inputted, may decrease. Consequently, the load inputted to a door or a vehicle-body constituting member located longitudinally adjacently to the door may increase. Thus, while some countermeasures for improving the strength of the door or the vehicle-body constituting member located longitudinally adjacently to the door have been considered, there is room for further improvement in the load transmission with the roof reinforcement.

Herein, it may be considered, as a means for preventing the upward deformation of the roof reinforcement in order to improve the load transmission with the roof reinforcement, that the plate thickness of the roof reinforcement is increased or its cross section is enlarged in the vehicle-body longitudinal direction or in the vertical direction, thereby attaining a rigidity increase of the roof reinforcement. However, there is a concern that these may cause a vehicle-weight increase or an occupant-space decrease improperly.

SUMMARY OF THE INVENTION

Accordingly, an object of the present invention is to compatibly prevent the deformation of the roof reinforcement and disperse of the large load inputted to the vehicle body to the roof reinforcement efficiently, suppressing the center pillar's coming into the cabin side greatly, when the large load is inputted from the vehicle side.

The present invention is an upper vehicle-body structure of a vehicle, comprising a pair of right-and-left roof side rails provided at both-side portions of a roof portion of a vehicle body and extending in a vehicle-body longitudinal direction, a pair of right-and-left center pillars provided at both-side portions of the vehicle body and extending in a vertical direction, respective upper end portions of which are joined to the pair of roof side rails, a roof reinforcement extending in a vehicle-body width direction, right-and-left both end portions of which are joined to the pair of roof side rails at the same positions, in the vehicle-body longitudinal direction, as respective joint portions of the pair of roof side rails to the pair of center pillars, and a pair of right-and-left gussets connecting respective lower portions of the pair of roof side rails and respective end portions of the roof reinforcement, each of the pair of gussets having a bending-causing portion to cause the gusset to be bending-deformed inward, in the vehicle-body width direction, when a large load is inputted from a vehicle side.

According to the present invention, since the lower portion of the roof side rail extending in the vehicle-body longitudinal direction and the end portion of the roof reinforcement extending in the vehicle-body width direction and joined to the roof side rail are connected via the gusset, the rigidity of a joint portion of the roof side rail to the roof reinforcement is improved, so that it is properly suppressed that the center pillar comes into the cabin side due to the load input from the vehicle side.

Further, since the bending-causing portion is provided at the gusset, when the large load, such as the impact load occurring in the vehicle side collision, is inputted to the center pillar from the vehicle side, the gusset is bending-deformed in accordance with a rotation of the roof side rail so as to absorb the load, suppressing the center pillar's coming into the cabin side. Thereby, it is properly suppressed that a rotational moment caused by the rotation of the roof side rail acts on the roof reinforcement.

Accordingly, the upward deformation of the roof reinforcement due to the rotational moment acting on the roof reinforcement and also the occupant-space decrease and the vehicle-weight increase due to the cross-section enlargement and the plate-thickness increase of the roof reinforcement which are countermeasures against the above-described deformation can be properly suppressed.

In an embodiment of the present invention, the gusset has a hole portion which is provided between a joint portion of the gusset to the roof side rail and a joint portion of the gusset to the roof reinforcement, and the bending-causing portion is notch portions which are provided at a front end portion and a rear end portion of an outward-side end portion, in the vehicle-body width direction, of the hole portion and extend in the vehicle-body longitudinal direction.

According to this embodiment, since the hole portion is provided at a portion of the gusset which is positioned between the joint portion to the roof side rail and the joint portion to the roof reinforcement, and the notch portions extending in the vehicle-body longitudinal direction are provided at the front end portion and the rear end portion of the hole portion, when the large load is applied to the center pillar from the vehicle side, stress concentrates on the notch portion, thereby bending-deforming the gusset effectively. Thus, the above above-described effects of the present invention are attained surely.

Further, since the above-described notch portions are provided at the outward-side end portion, in the vehicle-body width direction, of the hole portion, the notch portions tend to easily receive the load from the vehicle side, so that the stress concentration on the notch portions and the gusset's bending deformation can be attained effectively.

In another embodiment of the present invention, the roof reinforcement has an inverse-hat shaped cross section, and an end portion of the gusset which is positioned on a roof-reinforcement side is joined to the roof reinforcement, covering the roof reinforcement from a downward side, and has a bead portion which extends in the vehicle-body longitudinal direction.

According to this embodiment, since the gusset is joined to the end portion of the roof reinforcement such that it covers the roof reinforcement having the inverse-hat shaped cross section from a downward side and has the bead portion extending in the vehicle-body longitudinal direction, when the load is inputted from the vehicle side, for example, deformation of the inverse-hat shaped cross section of the roof reinforcement can be suppressed, and the rigidity decrease due to the deformation of the roof reinforcement can be prevented. This causes efficient dispersion of the input load from the vehicle side, thereby suppressing deformations of the center pillar or the roof side rail.

Other features, aspects, and advantages of the present invention will become apparent from the following description which refers to the accompanying drawings.

BRIEF DESCRIPTION OF THE DRAWINGS

FIG. 4 is a sectional view taken along line B-B of FIG. 3.

FIG. 7 is a sectional view taken along line D-D of FIG. 3.

DETAILED DESCRIPTION OF THE INVENTION

Hereafter, details of an upper vehicle-body structure of a vehicle according to some embodiments of the present invention will be described.

While an illustrated right-side part of the upper vehicle-body structure will be described, a left-side part of the upper vehicle-body structure is basically the same as the right-side part of the upper vehicle-body structure.

Figure 1:
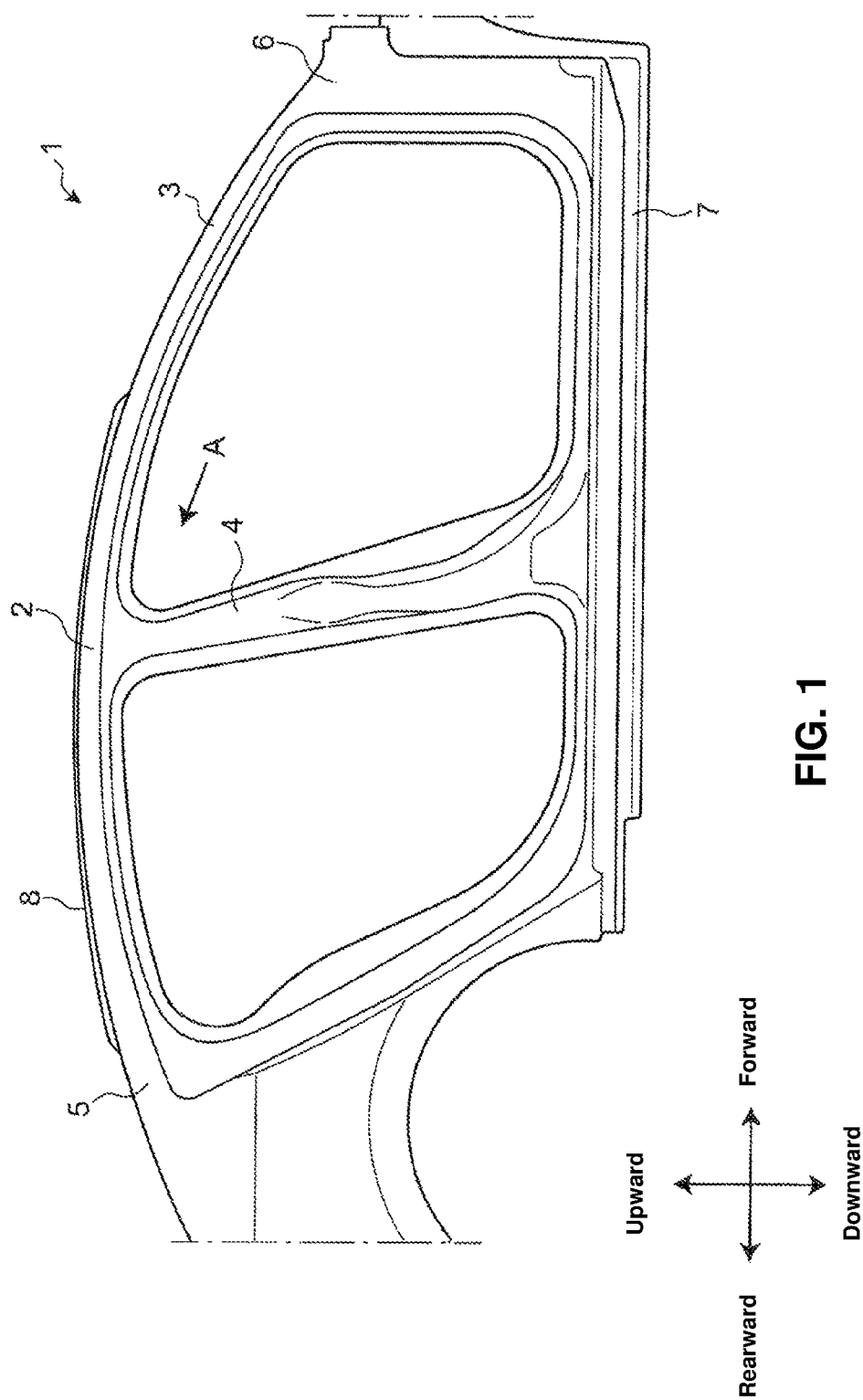
FIG. 1 is a side view of an upper vehicle-body structure of a vehicle according to an embodiment of the present invention.

As shown in FIG. 1, a roof side rail portion 2 which extends in the vehicle-body longitudinal direction is provided at an upper portion of a side portion of a vehicle body 1. A front pillar portion 3 is connected to a front end portion of the roof side rail portion 2, and a rear pillar portion 5 is connected to a rear end portion of the roof side rail portion 2.

To a front end of the front pillar portion 3 is connected an upper end of the hinge pillar portion 6 which extends vertically, at a lower end of the hinge pillar portion 6 is provided a side sill portion 7 which extends rearward, and at a central portion, in the vehicle-body longitudinal direction, of the side sill portion 7 is continuously provided a lower end portion of a center pillar portion 4 which extends downward from the roof side rail portion 2. Further, a roof panel 8 is joined to an upper portion of the side rail portion 2.

Herein, as shown in FIG. 1, each outer panel of the roof side rail portion 2, the front pillar portion 3, the center pillar portion 4, the rear pillar portion 5, the hinge pillar portion 6, and the side sill portion 7 is constituted by a sheet of side panel.

Figure 2:
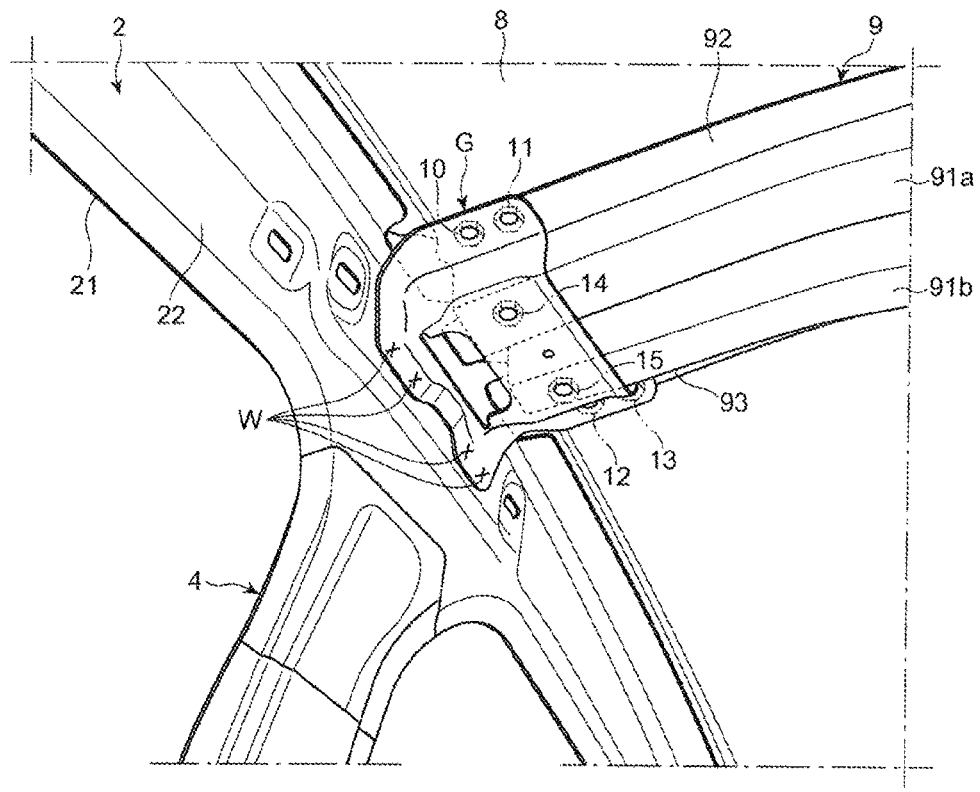
FIG. 2 is a perspective view of a major part around a joint portion of a roof side rail portion to a roof panel, which is indicated by an arrow A in FIG. 1.
Figure 2:
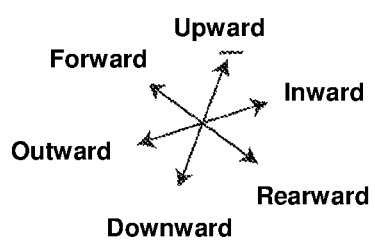

The right-side upper vehicle-body structure will be described referring to FIGS. 2, 3 and 4. FIG. 2 is a view of a joint portion of the roof side rail portion 2 to the roof panel 8, when viewed obliquely upward and rearward from the cabin side, FIG. 3 is a bottom view of the joint portion of the roof side rail portion 2 to the roof panel 8, when viewed from the cabin side, and FIG. 4 is a sectional view taken along line B-B of FIG. 3.

Figure 3:
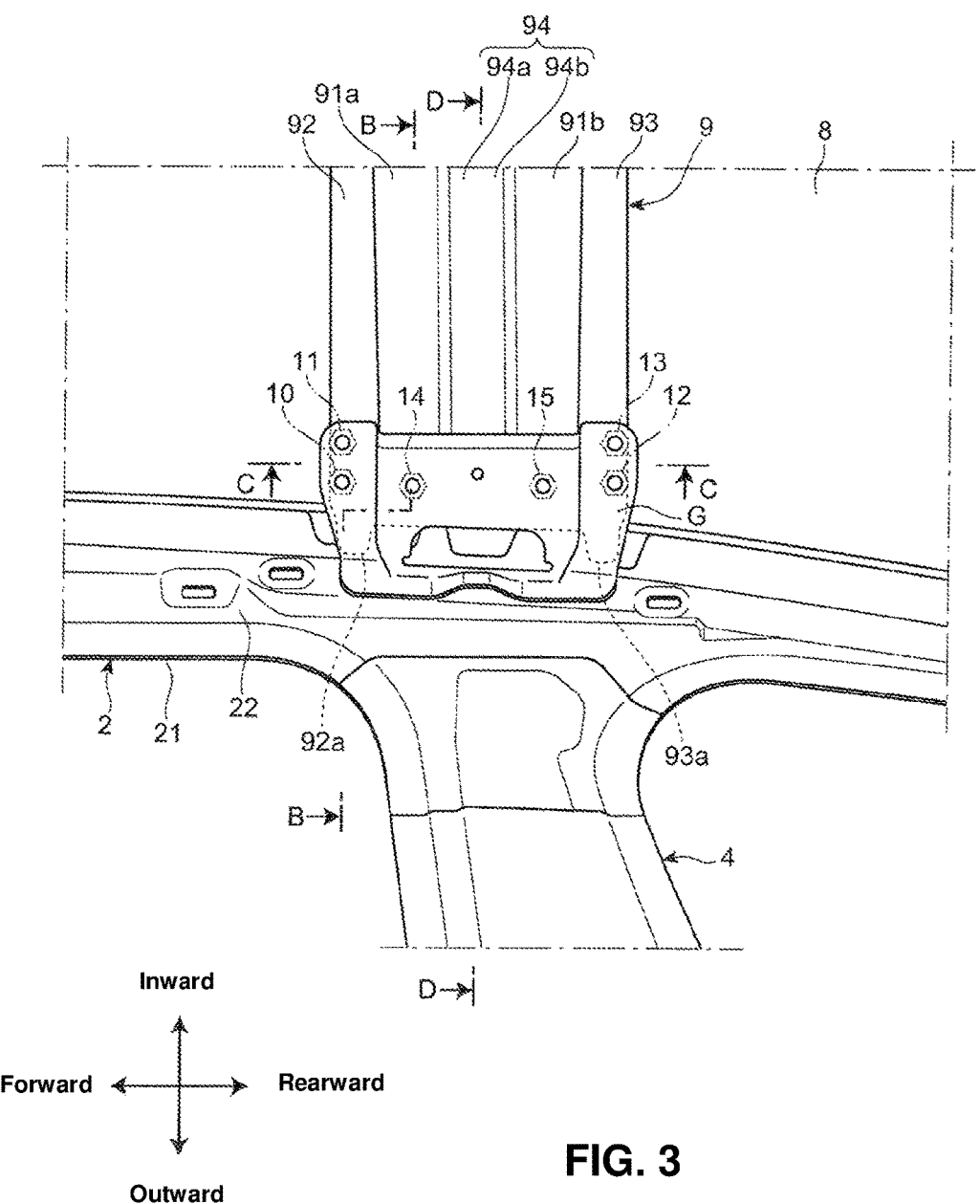
FIG. 3 is a bottom view of the major part around the joint portion of the roof side rail portion to the roof panel of the vehicle according to the embodiment of the present invention.

As shown in FIGS. 2 and 3, a roof reinforcement 9 is joined to the roof panel 8 from the vehicle inside, and the pair of right-and-left roof side rail portions 2, 2 which are provided at vehicle-body both sides are interconnected by the above-described roof reinforcement 9 which extends in the vehicle-body width direction. The roof reinforcement 9 is connected to the roof side rail portions 2 at respective positions which overlap the center pillar portions 4 in the vehicle-body longitudinal direction.

Further, as shown in FIG. 4, a groove-shaped joint portion X which extends in the vehicle-body longitudinal direction in a groove shape along the roof side rail portion 2 is provided between the roof panel 8 and the roof side rail portion 2. The roof panel 8 and the roof side rail portion 2 are joined at the above-described groove-shaped joint portion X.

Specifically, the roof panel 8 has a flange portion 8a which is formed by an outward-side end portion, in the vehicle-body width direction, thereof which is configured in a stepped-down shape to extend, and this flange portion 8a of the roof panel 8 constitutes the above-described groove-shaped joint portion X.

The roof side rail portion 2 comprises a roof side rail outer 21, a roof side rail inner 22, and a roof side rail reinforcement 23. The roof side rail outer 21 has a flange portion 21a which is formed by an inward-side end portion thereof which is configured in a stepped-down shape to extend, which constitutes a portion of the above-described groove-shaped joint portion X. Further, an upper end portion of the roof side rail inner 22 and an upper end portion of the roof side rail reinforcement 23 are configured to extend inward, in the vehicle-body width direction, and substantially in a horizontal direction, which form flange portions 22a, 23a, which constitute the above-described joint portion X together with the flange portion 21a of the roof reinforcement outer 21.

As shown in FIGS. 2 and 3, the roof reinforcement 9 has two continuous inverse-hat shaped cross sections which protrude from a roof side to a floor side, and recess portions 91a, 91b of the inverse-hat shaped cross section are configured to extend in the vehicle-body width direction. A front flange portion 92 and a rear flange portion 93 of the roof reinforcement 9 which extend in the vehicle-body longitudinal direction, respectively, are formed at both-side end portions, in the vehicle-body longitudinal direction, of an upper end of the recess portions 91a, 91b of the roof reinforcement 9, and a central flange portion 94 which interconnects upper ends of respective central sides of the recess portions 91a, 91b is formed between the recess portions 91a, 91b. The central flange portion 94 is configured to jointly have a rear flange portion 94a of the recess portion 91a and a front flange portion 94b of the recess portion 91b. These flange portions 92, 93, 94 are joined to a lower face of the roof panel 8 by an adhesive agent (not illustrated).

As shown in FIGS. 3 and 4, the front flange portion 92 and the rear flange portion 93 of the roof reinforcement 9 have tongue-piece portions 92a, 93a which extend outward from respective outward-side end portions of the flange portions 92, 93, which constitute another portion of the above-described groove-shaped joint portion X.

Thus, the flange portion 8a of the roof panel 8, the tongue-piece portions 92a, 93a of the roof reinforcement 9, the flange portion 21a of the roof side rail outer 21, the flange portion 23a of the roof side rail reinforcement 23, and the flange portion 22a of the roof side rail inner 22 overlap each other and joined together by welding at an overlapping portion, in the vehicle longitudinal direction, of the groove-shaped joint portion X to the roof reinforcement 9.

Herein, the center pillar portion 4 comprises a center pillar outer 41, a center pillar inner 42, and a center pillar reinforcement 43. The center pillar outer 41 is provided to be continuous to a lower side of the roof side rail outer 21, the center pillar inner 42 overlaps and is welded to an outward side, in the vehicle-body width direction, of a lower end portion of the roof side rail inner 22, and the center pillar reinforcement 43 overlaps and is welded to an outward side, in the vehicle-body width direction, of the roof side rail reinforcement 23.

Joining of the center pillar portion 4 and the roof reinforcement 9 to the roof side rail portion 2 is constituted as described above, and at this joint portion is provided a gusset G over the roof side rail inner 22 and the roof reinforcement 9.

The gusset G is joined to the roof side rail inner 22 at its welding portions W . . . W, and joined to the roof reinforcement 9 by plural bolts 10, 11, 12, 13, 14, 15.

Figure 5A:
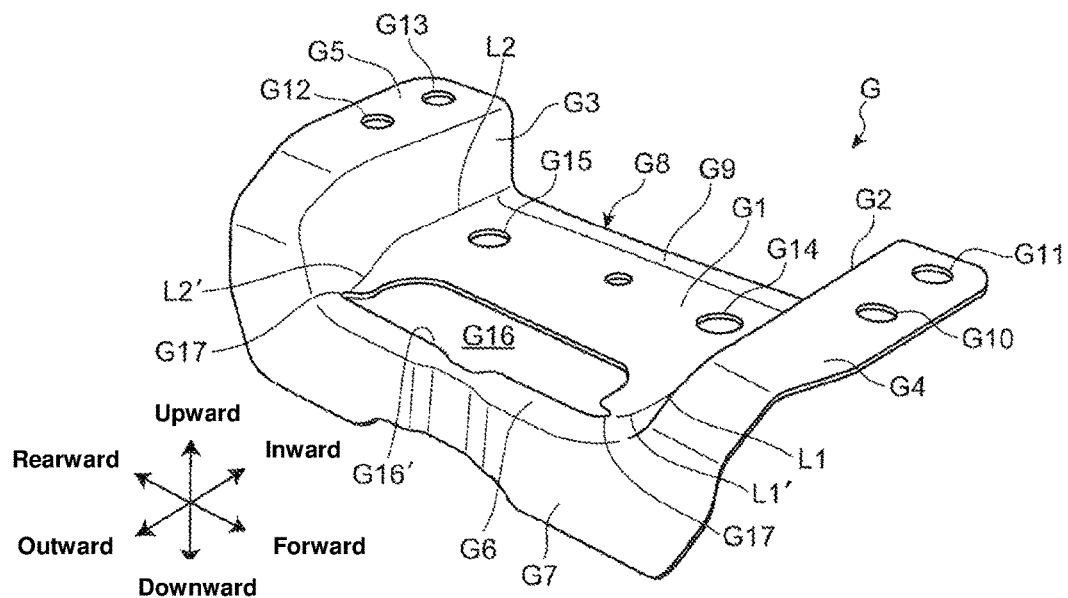
FIG. 5A is a perspective view of a gusset of the present embodiment, when viewed from an upward side.

Hereafter, the structure of the gusset G will be described specifically referring to FIGS. 5A and 5B, in addition to FIGS. 2-4. FIG. 5A is a perspective view of the gusset G, when viewed from the upward side, and FIG. 5B is a bottom view of the gusset G.

The gusset G comprises a base face portion G1, vertical wall portions G2, G3 which rise toward the roof panel 8 from end portions, in the vehicle-body longitudinal direction, of the base face portion G1, and flange portions G4, G5 which are provided to be parallel to the base face portion G1 which extend in the vehicle-body longitudinal direction from upper ends of the vertical wall portions G2, G3. Further, at an outward-side end portion G6 of the base face portion G1 is provided a side wall portion G7 which rises from the end portion G6 toward the floor side, and the side wall portion G7 and the above-described flange portions G4, G5 are configured to form a continuous surface.

Figure 5B:
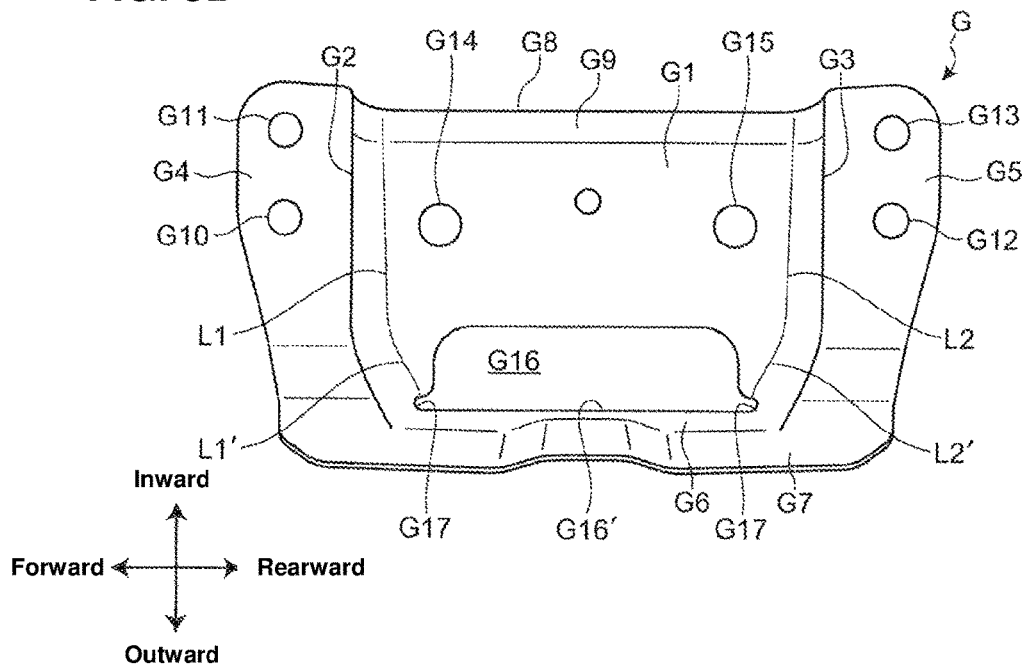
FIG. 5B is a bottom view of the gusset of the present embodiment.

As shown in FIGS. 5A and 5B, a hole portion G16 is provided at an outward-side area of the base face portion G1 of the gusset G, and notch portions G17, G17 which extend in the vehicle-body longitudinal direction are provided at an outward-side end portion G16', in the vehicle-body width direction, of the hole portion G16.

Further, respective outward-side end portions L1', L2' of bending-line portions L1, L2 where the vertical wall portions G2, G3 rise from the base face portion G1 of the gusset G are configured such that the end portion L1' curves rearward and the end portion L2' curves forward.

Thus, the end portions L1', L2' of the bending-line portions L1, L2 are provided near the notch portions G17, G17, that is, the direction of the bending-line portions L1, L2 having the high rigidity is bent such that it curves, changing discretely. Accordingly, when the load is inputted from the vehicle side, the load is transmitted to the bending-line portions L1, L2 and stress concentration on the notch portions G17, G17 is promoted, without blocking the bending deformation of the gusset G.

A bead portion G9 which extends in the vehicle-body longitudinal direction and protrudes toward the floor side is provided at a portion of an inward-side end portion G8 of the base face portion G1 of the gusset G which is located between the forward-side vertical wall portion G2 and the rearward-side vertical wall portion G3.

Further, a joint face portion of the gusset G to the roof reinforcement 9 is joined to the roof reinforcement 9 such that it covers the roof reinforcement 9 from the downward side as shown in FIG. 3. Specifically, vehicle-forward-side fastening portions G10, G11 which are provided at the vehicle-forward-side flange portion G4 of the gusset G and vehicle-rearward-side fastening portions G12, G13 which are provided at the vehicle-rearward-side flange portion G5 of the gusset G are respectively joined to the front flange portion 92 and the rear flange portion 93 of the roof reinforcement 9 by the bolts 10, 11, 12, 13. Further, fastening portions G14, G15 which are provided at the base face portion G1 of the gusset G and the recess portions 91a, 91b of the roof reinforcement 9 are joined by the bolts 14, 15.

Herein, the vehicle-forward-side fastening portion G10 and the vehicle-rearward-side fastening portion G12 of the gusset G and also the vehicle-forward-side fastening portion G11 and the vehicle-rearward-side fastening portion G13 of the gusset G are arranged such that they are respectively aligned in the vehicle-body longitudinal direction at the same positions in the vehicle-body width direction. Likewise, the fastening portion G14 and the fastening portion G15 of the base face portion G1 of the gusset G are arranged such that they are aligned in the vehicle-body longitudinal direction at the same position in the vehicle-body width direction.

Thereby, since the load inputted from the vehicle side is equally inputted to the vehicle-forward-side fastening portion G10 and the vehicle-rearward-side fastening portion G12, the vehicle-forward-side fastening portion G11 and the vehicle-rearward-side fastening portion G13, and the fastening portion G14 and the fastening portion G15 of the gusset G, it is prevented that the load concentrates on the one-side fastening portion only. For example, in a case where the vehicle-forward-side fastening portion G10 is arranged at an offset position, in the vehicle-body width direction, from the vehicle-rearward-side fastening portion G12 in the vehicle-body front view, the load more concentrates on the fastening portion which is positioned on the outward side.

Meanwhile, as shown in FIG. 4, a lower portion 22b of the roof side tail inner 22 and the side wall portion G7 which is positioned below the gusset G are joined together by welding points W . . . W at an end portion of the gusset G which is positioned on the side of the roof side rail portion 2.

Figure 6:
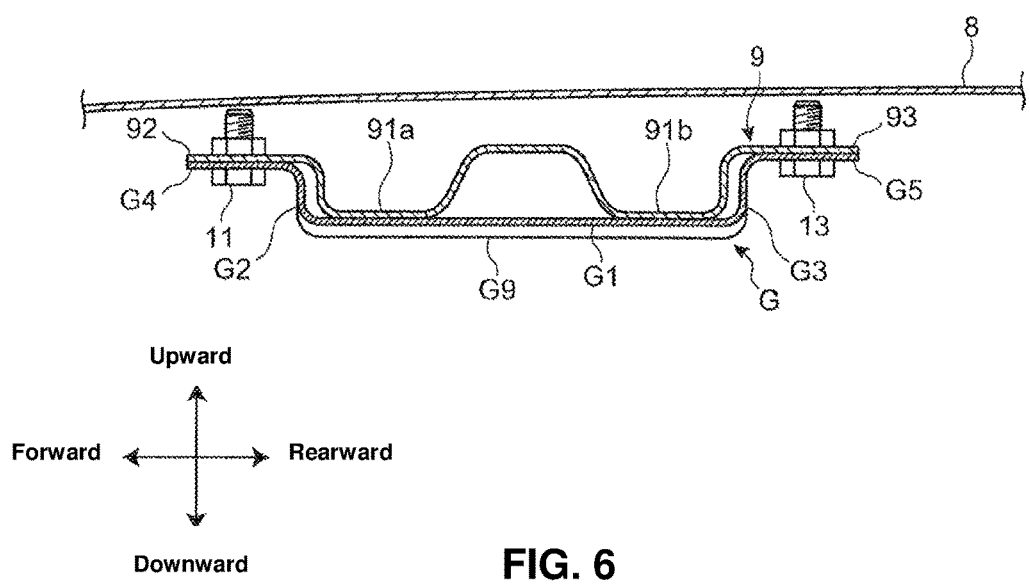
FIG. 6 is a sectional view taken along line C-C of FIG. 3.

As described above, since the gusset G is arranged such that it covers the recess portions 91a, 91b of the roof reinforcement 9 from the vehicle-body lower side and also, as shown in FIG. 6, the gusset G is joined over the front flange portion 92 and the rear flange portion 93 of the roof reinforcement 9, when the load is inputted from the vehicle side, for example, it is prevented by the bead portion G9 of the gusset G that the inverse-shaped cross section of the roof reinforcement 9 is deformed such that its cross section opens, thereby preventing the rigidity decrease of the roof reinforcement 9.

As shown in FIGS. 3 and 7, the notch portions G17, G17 which are provided at the outward side of the hole portion G16 formed at the base face portion G1 of the gusset G are provided at a position which substantially matches the vehicle-forward-side end portion of the groove-shaped joint portion X in the vehicle-body width direction in the front view.

Thereby, when the large load is inputted from the vehicle side, for example, the stress concentrates on the notch portions G17, G17 of the gusset G effectively, so that the gusset G is made to be bending-deformed.

The present embodiment is constituted as described above, and its operation (working) will be described.

Figure 8A:
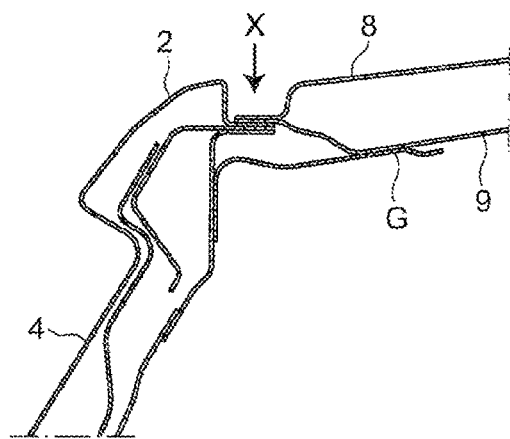
FIGS. 8A, 8B and 8C are explanatory diagrams of the upper vehicle-body structure, when viewed from a vehicle-body forward side, in the states before and after a load is inputted from a vehicle side.
Figure 8B:
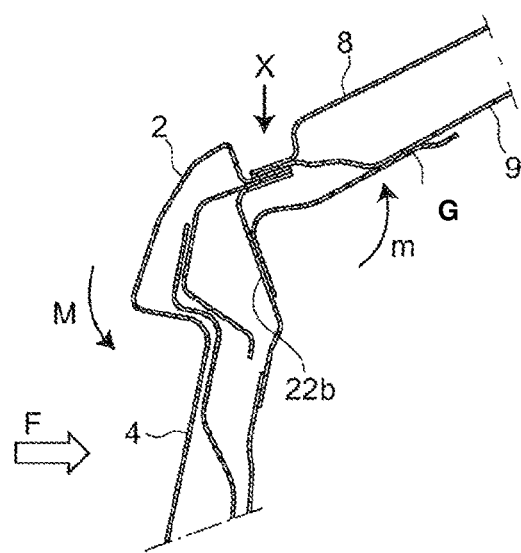
Figure 8C:
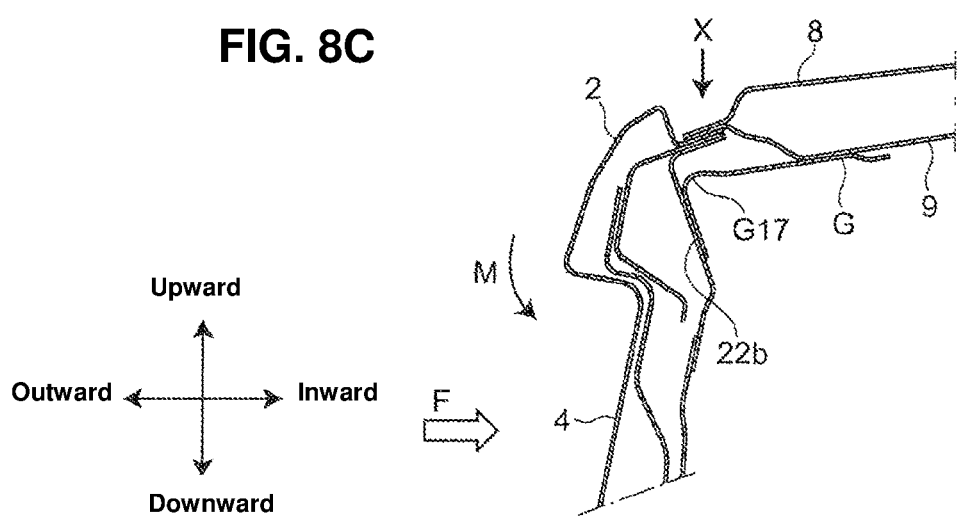

Relating to the upper vehicle-body structure according to the present embodiment, FIG. 8A is a schematic diagram of shapes of the roof side rail portion 2, the roof reinforcement 9, and the gusset G, when viewed from the vehicle forward side, and FIGS. 8B and 8C are schematic diagrams of the shapes of the respective portions after the deformation when the large load is inputted from the vehicle side, when viewed from the vehicle forward side. FIG. 8B shows shapes of the respective portions in a case where a bending-causing portion is not provided at the gusset G of the present embodiment, and FIG. 8C shows shapes of the respective portions in a case where the gusset G is configured according to the present embodiment.

Further, FIGS. 8A, 8B and 8C exaggeratedly show a rotation of the roof side rail portion, a position of the roof reinforcement, and a shape of the gusset, respectively, for explaining the gusset's bending deformation caused by the rotation of the roof side rail portion.

In the upper vehicle-body structure shown in FIG. 8B, when a load F is inputted to the center pillar portion 4 from the vehicle side, the roof side rail portion 2 is rotated around the groove-shaped joint portion X which corresponds to its joint portion to the roof reinforcement 9 as illustrated by an arrow M such that its lower portion moves toward the cabin side. Consequently, a bending moment m acts in a direction so that the joint portion of the roof reinforcement 9 to the gusset G is raised via the gusset G which is joined to the lower portion 22b of the roof side rail inner 22, so that the roof reinforcement 9 is deformed upward.

Meanwhile, in the upper vehicle-body structure shown in FIG. 8C as well, similarly to FIG. 8B, when the load F is inputted to the center pillar portion 4 from the vehicle side, the upper portion of the center pillar portion 4 is deformed toward the cabin side, so that the roof side rail portion 2 is rotated around the groove-shaped joint portion X which corresponds to its joint portion to the roof reinforcement 9 as illustrated by the arrow M such that its lower portion moves toward the cabin side. Consequently, the gusset G joined to the lower portion 22b of the roof side rail inner 22 is bending-deformed toward the cabin side.

Herein, the bending deformation of the gusset G is caused by the notch portions (bending-casing portion) G17, G17 provided at the gusset G. Specifically, the load F is transmitted to the gusset G from the roof side rail portion 2, and the stress concentrates on the notch portions G17, G17 which are provided at the gusset G as the bending-causing portion, so that the bending deformation occurs at the gusset G.

Thus, since the gusset G does not follow the rotation of the roof side rail portion, an upward-bending moment of the roof reinforcement 9 is not transmitted but part of the above-described load F is absorbed by the bending deformation of the gusset G, and also the roof side rail portion 2 contacts the roof reinforcement 9, so that only the load applied in the vehicle-body width direction is transmitted to the roof reinforcement 9 from the roof side rail portion 2.

While the present invention was described by using the above-described embodiment, the present invention is not to be limited to this embodiment.

Other embodiments will be described referring to FIGS. 9A and 9B. The same character references for the same structures as those of the embodiment shown in FIG. 2 will be used in FIGS. 9A and 9B, descriptions of which are omitted here.

Figure 9A:
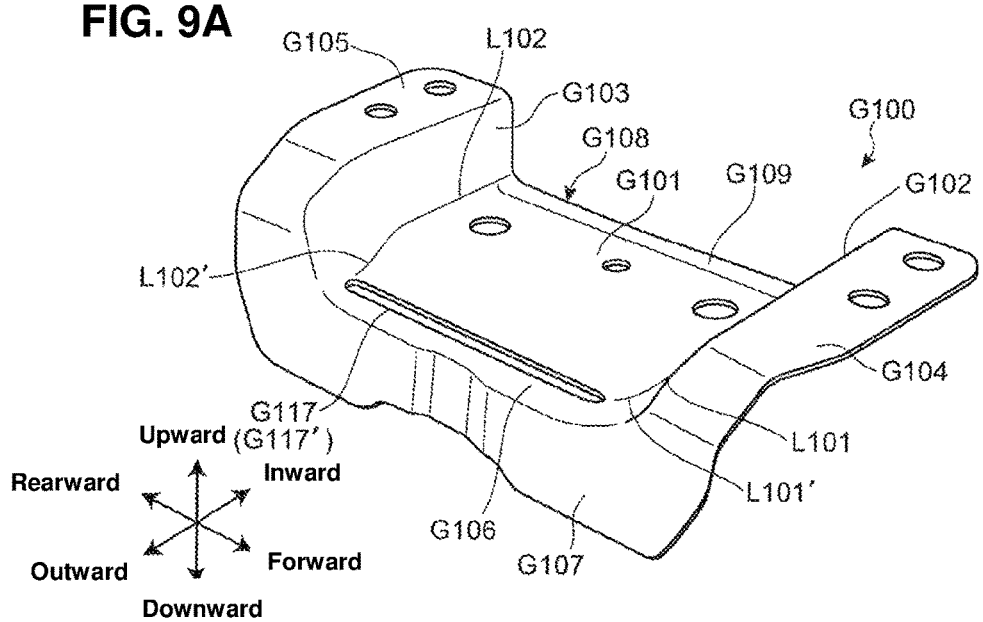
FIG. 9A is a perspective view of a gusset according to another embodiment.
Figure 9B:
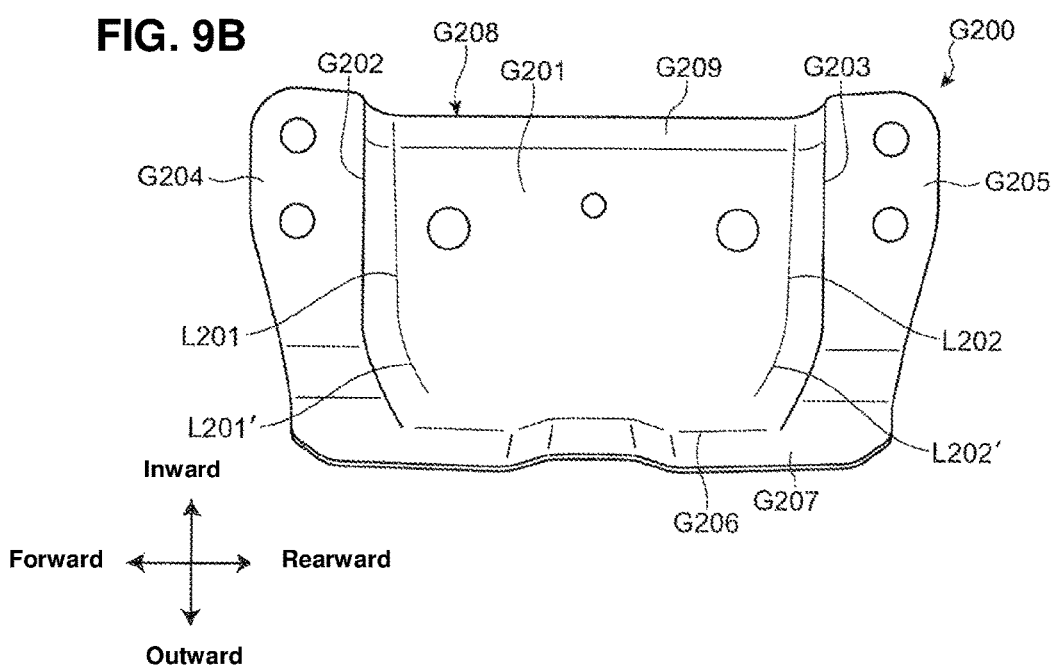
FIG. 9B is a bottom view of a gusset according to f further another embodiment.

The other embodiments shown in FIGS. 9A and 9B are different from the above-described embodiment in the shape of the bending-causing portion of the gusset G. Herein, the other structures are basically the same as the above-described embodiment, so that the same effects as the above-described embodiment are obtained.

As shown in FIG. 9A, a gusset G100 which connects the roof side rail portion 2 and the roof reinforcement 9 comprises, similarly to the above-described embodiment, a base face portion G101, vertical wall portions G102, G103 which rise from end portions, in the vehicle-body longitudinal direction, of the base face portion G101 toward the roof panel 8, and flange portions G104, G105 which extend in the vehicle-body longitudinal direction from upper ends of the vertical wall portions G102, G103 in parallel to the base face portion G101. Further, at an outward-side end portion G106 of the base face portion G101 is provided a side wall portion G107 which rises from the end portion G106 toward the floor side, and the side wall portion G107 and the flange portions G104, G105 are configured to form a continuous surface. Herein, the side wall portion G107 of the gusset G100 forms its joint face portion to the roof side rail inner 22.

Further, at the outward-side end portion G106 of the base face portion G101 of the gusset G100 is provided a slit portion G117 which has a long area, in the vehicle-body longitudinal direction, as the bending-causing portion in place of the notch portions G17, G17 which are provided at the hole portion G16 of the gusset G of the above-described embodiment.

Further, respective outward-side end portions L101', L102' of bending-line portions L101, L102 where the vertical wall portions G102, G103 rise from the base face portion G101 of the gusset G100 are configured such that the end portion L101' curves rearward and the end portion L102' curves forward.

A bead portion G109 which extends in the vehicle-body longitudinal direction and protrudes toward the floor side is provided at an inward-side end portion G108 of the base face portion G101 of the gusset G100 between the forward-side vertical wall portion G102 and the rearward-side vertical wall portion G103.

According to this embodiment, since the stress concentrates on the slit portion G117 when the load F is inputted to the center pillar portion from the vehicle side, the bending deformation occurs at the gusset G100. Consequently, the same effects as the above-described embodiment are obtained. Herein, the area where the slit portion G117 is provided may be formed by a thin-thickness portion G117' as the bending-causing portion.

Additionally, as shown in FIG. 9B, a gusset G200 which connects the roof side rail portion 2 and the roof reinforcement 9 comprises, similarly to the above-described embodiment, a base face portion G201, vertical wall portions G202, G203 which rise from end portions, in the vehicle-body longitudinal direction, of the base face portion G201 toward the roof panel 8, and flange portions G204, G205 which extend in the vehicle-body longitudinal direction from upper ends of the vertical wall portions G202, G203 in parallel to the base face portion G201. Further, at an outward-side end portion G206 of the base face portion G201 is provided a side wall portion G207 which rises from the end portion G206 toward the floor side, and the side wall portion G207 and the flange portions G204, G205 are configured to form a continuous surface. Herein, the side wall portion G207 of the gusset G200 forms its joint face portion to the roof side rail inner 22.

Further, respective outward-side end portions L201', L202' of bending-line portions L201, L202 where the vertical wall portions G202, G203 rise from the base face portion G201 of the gusset G200 are configured such that the end portion L201' curves rearward and the end portion L202' curves forward.

A bead portion G209 which extends in the vehicle-body longitudinal direction and protrudes toward the floor side is provided at an inward-side end portion G208 of the base face portion G201 of the gusset G200 between the forward-side vertical wall portion G202 and the rearward-side vertical wall portion G203.

Thereby, the stress concentrates on the above-described curving end portions L201', L202', so that the effects as the bending-causing portion can be attained. Thus, the same effects as the above-described embodiments are obtained.

What is claimed is:

1. An upper vehicle-body structure of a vehicle, comprising:
   a pair of right-and-left roof side rails provided at both-side portions of a roof portion of a vehicle body and extending in a vehicle-body longitudinal direction;
   a pair of right-and-left center pillars provided at both-side portions of the vehicle body and extending in a vertical direction, respective upper end portions of which are joined to the pair of roof side rails;
   a roof reinforcement extending in a vehicle-body width direction, right-and-left both end portions of which are joined to the pair of roof side rails at the same positions, in the vehicle-body longitudinal direction, as respective joint portions of the pair of roof side rails to the pair of center pillars; and
   a pair of right-and-left gussets connecting respective lower portions of the pair of roof side rails and respective end portions of the roof reinforcement, each of the pair of gussets having a bending-causing portion to cause the gusset to be bending-deformed inward, in the vehicle-body width direction, when a load is inputted from a vehicle side,
   wherein said gusset comprises a base face portion extending in the vehicle-body longitudinal direction, and a hole portion which is provided at said base face portion of the gusset between a joint portion of the gusset to the roof side rail and a joint portion of the gusset to the roof reinforcement, and said bending-causing portion is made of notch portions which are provided at said base face portion of the gusset at a front end portion and a rear end portion of an outward-side end portion, in the vehicle-body width direction, of said hole portion and extend in the vehicle-body longitudinal direction, whereby the gusset is configured such that the joint portion to the roof side rail is bent inward, in the vehicle-body width direction, around the notch portions when the load is inputted from the vehicle side.

2. The upper vehicle-body structure of the vehicle of claim 1, wherein said roof reinforcement has an inverse-hat shaped cross section, and an end portion of said gusset which is positioned on a roof-reinforcement side is joined to the roof reinforcement, covering the roof reinforcement from a downward side, and has a bead portion which extends in the vehicle-body longitudinal direction.

\* \* \* \* \*